(12) United States Patent
Chen et al.

(10) Patent No.: US 9,738,768 B2
(45) Date of Patent: *Aug. 22, 2017

(54) BLOWING AGENT COMPOSITION OF HYDROCHLOROFLUOROOLEFIN

(71) Applicant: Arkema Inc., King of Prussia, PA (US)

(72) Inventors: Benjamin Bin Chen, Wayne, PA (US); Philippe Bonnet, Lyons (FR); Brett L. Van Horn, King of Prussia, PA (US); Joseph S. Costa, Gilbertsville, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/992,250

(22) Filed: Jan. 11, 2016

(65) Prior Publication Data

US 2016/0122495 A1    May 5, 2016

Related U.S. Application Data

(63) Continuation-in-part of application No. 13/649,346, filed on Oct. 11, 2012, now Pat. No. 9,234,070, which
(Continued)

(51) Int. Cl.
C08J 9/14        (2006.01)
C08J 9/00        (2006.01)
(Continued)

(52) U.S. Cl.
CPC .............. *C08J 9/144* (2013.01); *C08G 18/06* (2013.01); *C08G 18/4018* (2013.01); *C08G 18/482* (2013.01); *C08G 18/6674* (2013.01); *C08G 18/7664* (2013.01); *C08J 9/146* (2013.01); *C08J 9/149* (2013.01); *C08G 2101/00* (2013.01); *C08J 2203/142* (2013.01); *C08J 2203/162* (2013.01);
(Continued)

(58) Field of Classification Search
None
See application file for complete search history.

(56) References Cited

U.S. PATENT DOCUMENTS 3,723,318 A    3/1973  Butler
5,710,352 A    1/1998  Tung
(Continued)

FOREIGN PATENT DOCUMENTS

JP    WO 2004044084 A1 *  5/2004    ............ C08G 18/14
JP         2005-179042 A2      7/2005
(Continued)

OTHER PUBLICATIONS

Mortelmans, K. et al., The Ames *Salmonella*/Microsome Mutagenicity Assay, Mutation Research, 455 2000, pp. 29-60.
(Continued)

*Primary Examiner* — Kara Boyle
(74) *Attorney, Agent, or Firm* — Steven D. Boyd

(57) ABSTRACT

A blowing agent for thermosetting foams is disclosed. The blowing agent is predominately the trans isomer of the hydrochlorofluoroolefin (HCFO) HFCO-1233zd alone or in combination with a hydrofluoroolefin (HFO), hydrofluorocarbon (HFC), hydrochlorofluoroolefin (HCFO), a hydrocarbon. The blowing agent is effective as a blowing agent in the manufacture of thermosetting foams.

21 Claims, 6 Drawing Sheets

Related U.S. Application Data is a continuation-in-part of application No. 12/532,183, filed as application No. PCT/US2008/058600 on Mar. 28, 2008, now Pat. No. 8,314,159.

(60) Provisional application No. 60/972,037, filed on Sep. 13, 2007, provisional application No. 60/949,656, filed on Jul. 13, 2007, provisional application No. 60/908,751, filed on Mar. 29, 2007.

(51) Int. Cl.
| | | |
|---|---|---|
| *C08G 18/06* | (2006.01) | |
| *C08G 18/66* | (2006.01) | |
| *C08G 18/76* | (2006.01) | |
| *C08G 18/40* | (2006.01) | |
| *C08G 18/48* | (2006.01) | |
| *C08G 101/00* | (2006.01) | |

(52) U.S. Cl.
CPC ...... *C08J 2203/182* (2013.01); *C08J 2375/04* (2013.01)

(56) References Cited

U.S. PATENT DOCUMENTS

| | | |
|---|---|---|
| 6,076,372 A | 6/2000 | Acharva et al. |
| 8,338,355 B2 | 12/2012 | Ishihara et al. |
| 2004/0256594 A1 | 12/2004 | Singh et al. |
| 2006/0014843 A1* | 1/2006 | Tanaka ............... C08G 18/14 521/99 |
| 2006/0142173 A1 | 6/2006 | Johnson et al. |
| 2006/0243945 A1 | 11/2006 | Minor et al. |
| 2007/0010592 A1 | 1/2007 | Bowman et al. |
| 2008/0157022 A1 | 7/2008 | Singh et al. |

FOREIGN PATENT DOCUMENTS

| | | |
|---|---|---|
| WO | WO 2007/002625 A2 | 1/2007 |
| WO | WO 2007/002703 A2 | 1/2007 |

OTHER PUBLICATIONS

Niyogi, D. et al., Water Blown Free Rise Polyurethane Foams, Polymer Engineering and Science, vol. 39, Issue 1, Jan. 1999, pp. 199-209.

\* cited by examiner

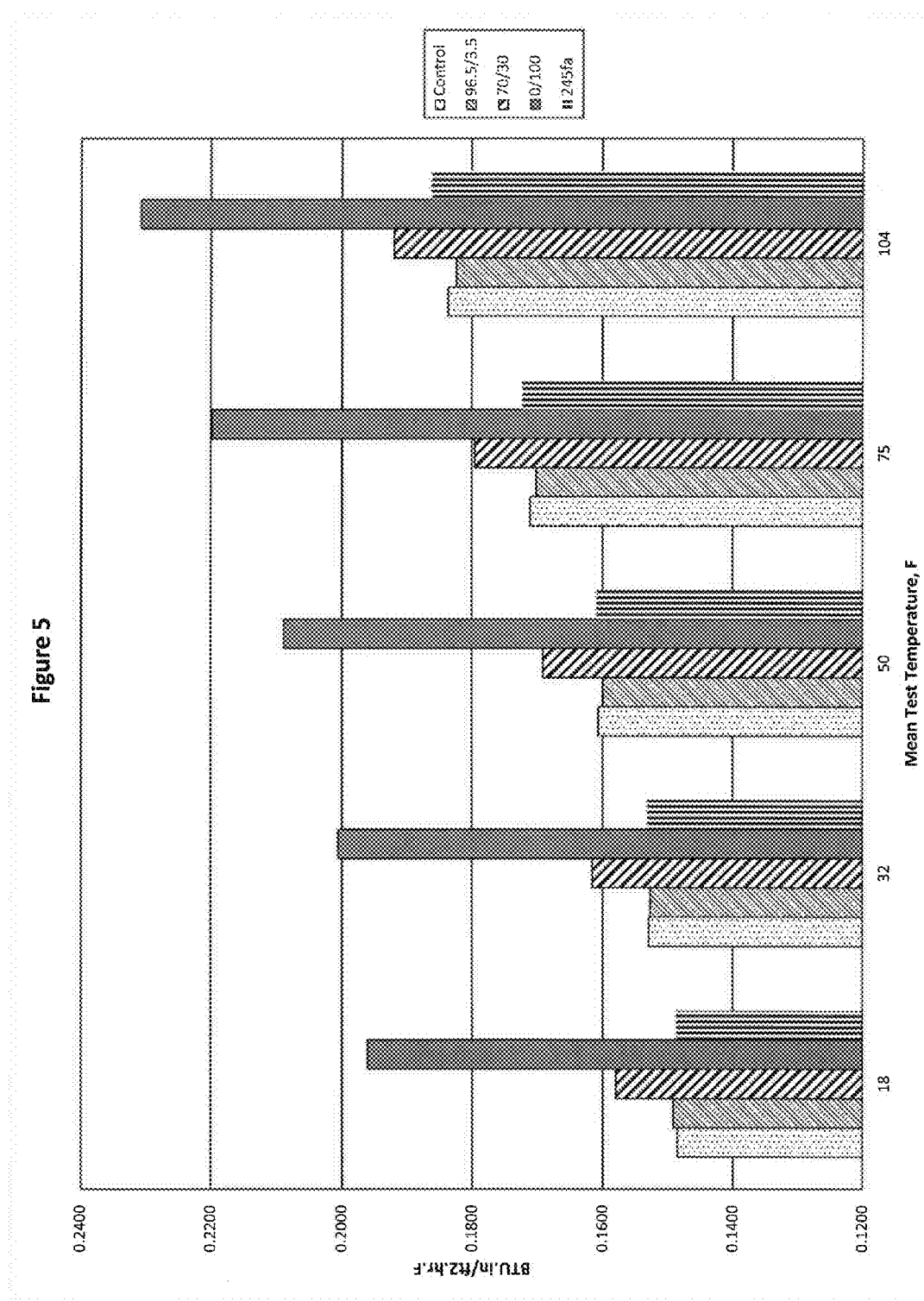

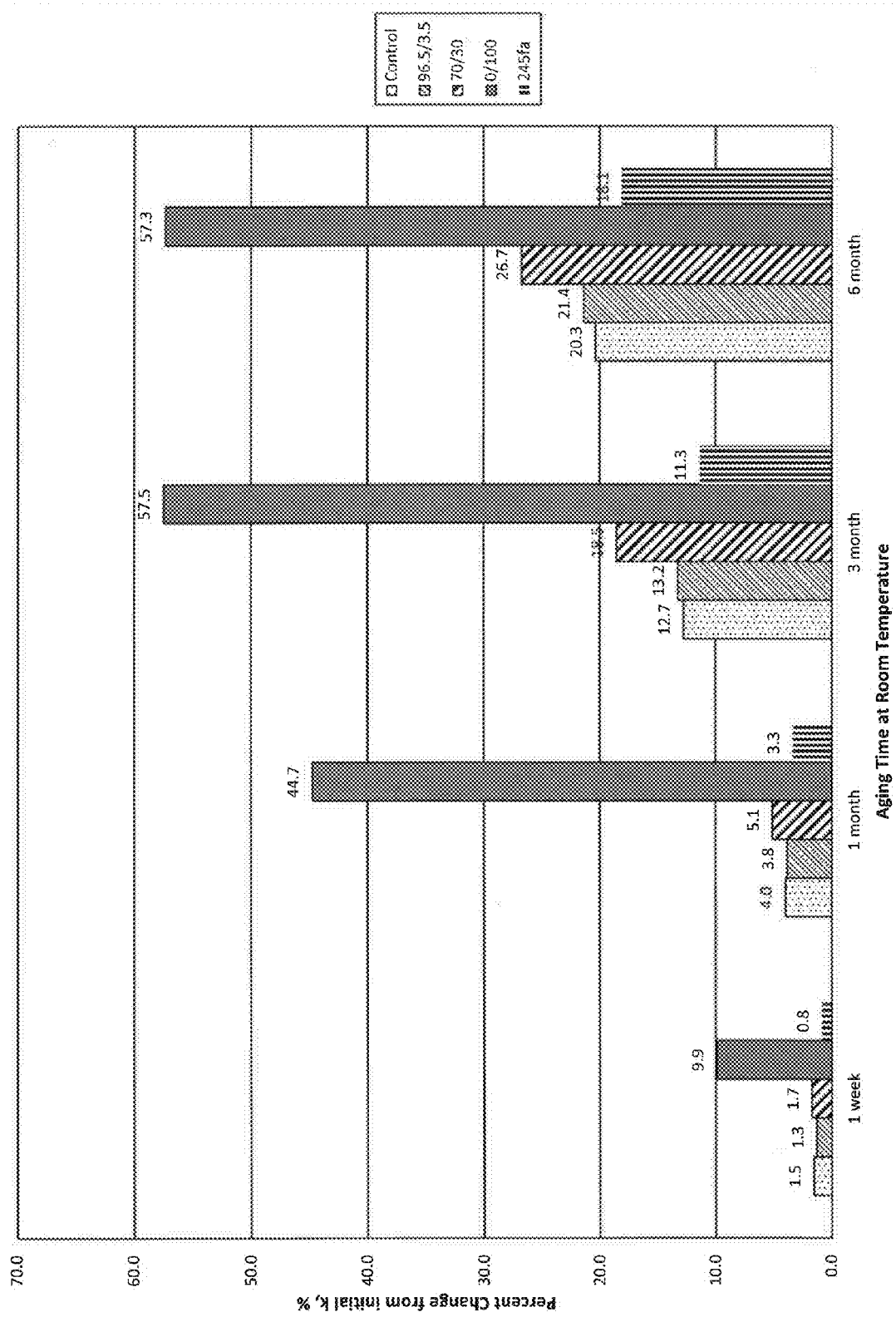

BLOWING AGENT COMPOSITION OF HYDROCHLOROFLUOROOLEFIN

This application is continuation-in-part of U.S. patent application Ser. No. 13/649,346, filed Oct. 11, 2012, which is a continuation-in-part of U.S. patent application Ser. No. 12/532,183, filed Sep. 21, 2009, which claims priority to International patent application serial number PCT/US2008/058600, filed Mar. 28, 2008, which claims priority to U.S. provisional patent application Ser. No. 60/972,037, filed Sep. 13, 2007, and U.S. provisional patent application Ser. No. 60/949,656, filed Jul. 13, 2007 and U.S. provisional application Ser. No. 60/908,751, filed Mar. 29, 2007.

FIELD OF THE INVENTION

The present invention relates to blowing agents for thermosetting foams. More particularly, the present invention relates to the use of the hydrochlorofluoroolefin (HCFO) HCFO-1233zd alone or in a combination as a blowing agent in the manufacture of thermosetting foams. The HCFO-1233zd of the present invention is predominantly the trans isomer.

BACKGROUND OF THE INVENTION

The Montreal Protocol for the protection or the ozone layer, signed in October 1987, mandated the phase out of the use of chlorofluorocarbons (CFCs). Materials more "friendly" to the ozone layer, such as hydrofluorocarbons (HFCs) eg HFC-134a replaced chlorofluorocarbons. The latter compounds have proven to be green house gases, causing global warming and were regulated by the Kyoto Protocol on Climate Change, signed in 1998. The emerging replacement materials, hydrofluoropropenes, were shown to be environmentally acceptable i.e. has zero ozone depletion potential (ODP) and acceptable low global warming potential (GWP).

Currently used blowing agents for thermoset foams include HFC-134a, HFC-245fa, HFC-365mfc that have relatively high global warming potential, and hydrocarbons such as pentane isomers which are flammable and have low energy efficiency. Therefore, new alternative blowing agents are being sought. Halogenated hydroolefinic materials such as hydrofluoropropenes and/or hydrochlorofluoropropenes have generated interest as replacements for HFCs. The inherent chemical instability of these materials in the lower atmosphere provides the low global warming potential and zero or near zero ozone depletion properties desired, The object of the present invention is to provide novel compositions that can serve as blowing agents for thermosetting foams that provide unique characteristics to meet the demands of low or zero ozone depletion potential, lower global warming potential and exhibit low toxicity.

BRIEF DESCRIPTION OF THE DRAWINGS

FIG. 5 is a graph of k-factor at six months versus temperature from Example 5.

FIG. 6 is a graph of percent change in k-factor in Btu.in./ft$^2$.h.° F. at 50° F. (10° C.) mean test from Example 5.

DETAILED DESCRIPTION OF THE INVENTION

Figure 1:
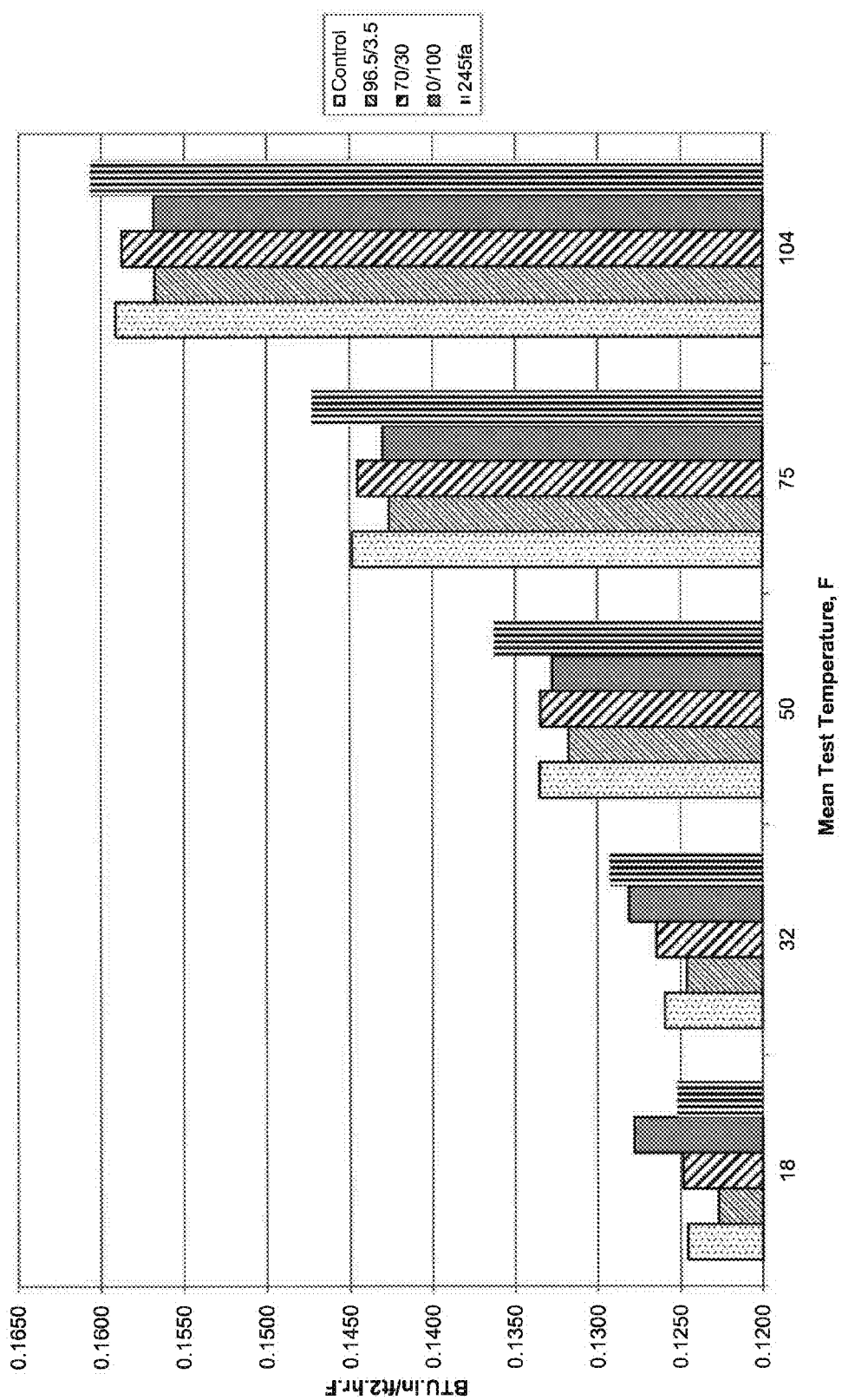
FIG. 1 is a graph of initial k-factor versus temperature from Example 2.

The present invention relates to the use of blowing agents with negligible (low or zero) ozone-depletion and low GWP based upon unsaturated halogenated hydroolefins. The blowing agents comprise the hydrochlorofluoroolefin (HCFO), 1-chloro-3,3,3-trifluoropropene (HCFO-1233zd) alone or in a combination including a hydrofluoroolefin (HFO), a hydrochlorofluoroolefin (HCFO), a hydrofluorocarbon (HFC), a hydrocarbon, an alcohol, an aldehyde, a ketone, an ether/diether or carbon dioxide. The HCFO-1233zd of the present invention is predominantly the trans isomer of HCFO-1233zd.

Trans (E) and cis (Z) isomers are illustrated:

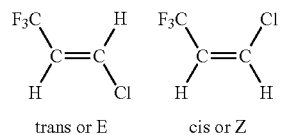

trans or E        cis or Z

Hydrochlorofluoroolefin (HCFO) HCFO-1233 has been proposed as blowing agents which exhibit a low global warming potential and a low ozone depletion value. The low global warming potential and a low ozone depletion value are a result of the atmospheric degradation of the hydrohaloolefins.

The predominately trans isomer of the hydrochlorofluoroolefin HCFO-1233zd, alone or in a combination with HFOs can be used as a foaming agent for thermosetting foams by being mixed in a polyols mixture. The resulted products show superior quality including decreased density and improved k-factor. The foaming agent readily dissolves in thermosetting polymers, and provides a degree of plasticization sufficient to produce acceptable foams. HCFO 1233zd is a liquid at ambient temperature, which allows for ease of handling as is desired by various industries particularly for polyurethane foams. The preferred HFO component typically contains 3 or 4 carbons, and including but not limited to pentafluoropropene, such as 1,2,3,3,3-pentafluoropropene (HFO 1225ye), tetrafluoropropene, such as 1,3,3,3-tetrafluoropropene (HFO 1234ze), 2,3,3,3-tetrafluoropropene (HFO 1234yf), 1,2,3,3-tetrafluoropropene (HFO1234ye), trifluoropropene, such as 3,3,3-trifluoropropene (1243zf). Preferred embodiments of the invention are blowing agent compositions of unsaturated halogenated hydroolefins with normal boiling points less than about 60° C.

The preferred blowing agent composition, either HCFO-1233zd, predominately the trans isomer, alone or in a combination, of the present invention exhibits good solubility in polyol mixture used in producing polyurethane and polyisocyanurate foams. A major portion of the HCFO-1233zd component of the present invention is the trans isomer. It was discovered that the trans isomer exhibits a significantly lower genotoxicity in AMES testing than the cis isomer. A preferred ratio of trans and cis isomers of HCFO-1233zd is less than about 30% weight of the combination of the cis isomer, and preferably less than about 10% of the cis isomer. The most preferred ratio is less than about 3% of the cis isomer. The preferred blowing agent combination produces foam having desirable levels of insulating value.

The HCFO-1233zd of the present invention may be used in combination with other blowing agents including but not limited to: (a) hydrofluorocarbons including but not limited to difluoromethane (HFC32); 1,1,1,2,2-pentafluoroethane (HFC125); 1,1,1-trifluoroethane (HFC143a); 1,1,2,2-tetrafluorothane (HFC134); 1,1,1,2-tetrafluoroethane (HFC134a); 1,1-difluoroethane (HFC152a); 1,1,1,2,3,3,3-heptafluoropropane (HFC227ca); 1,1,1,3,3-pentafluoropropane (HFC245fa); 1,1,1,3,3-pentafluorobutane (HFC365mfc) and 1,1,1,2,2,3,4,5,5,5-decafluoropentane (HFC4310mee), (b) hydrofluoroolefins including but not limited to tetrafluoropropenes (HFO1234), trifluoropropenes (HFO1243), all tetrafluorobutene isomers (HFO354), all pentafluorobutene isomers (HFO1345), all hexafluorobutene isomers (HFO1336), all heptafluorobutene isomers (HFO1327), all heptafluoropentene isomers (HFO1447), all octafluoropentene isomers (HFO1438), all nonafluoropentene isomers (HFO1429), (c) hydrocarbons including but not limited to, pentane isomers, butane isomers, (d) C1 to C5 alcohols, C1 to C4 aldehydes, C1 to C4 ketones, C1 to C4 ethers and diethers and carbon dioxide, (e) HCFOs such as 2-chloro-3,3,3-trifluoropropene (HCFO-1233xf) and dichlorotrifluoropropene (HCFO1223).

The foamable compositions of the present invention generally include one or more components capable of forming foam having a generally cellular structure and a blowing agent, typically in a combination, in accordance with the present invention. In certain embodiments, the one or more components comprise a thermosetting composition capable of forming foam and/or foamable compositions. Examples of thermosetting compositions include polyurethane and polyisocyanurate foam compositions, and also phenolic foam compositions. In such thermosetting foam embodiments, one or more of the present compositions are included as or part of a blowing. agent in a foamable composition, or as a part of a two or more part foamable composition, which preferably includes one or more of the components capable of reacting and/or foaming under the proper conditions to form a foam or cellular structure.

The invention also relates to foam, and preferably closed cell foam, prepared from a polymer foam formulation containing a blowing agent comprising the compositions of the present invention. In yet other embodiments, the invention provides foamable compositions comprising thermosetting foams, such as polyurethane and polyisocyanurate foams, preferably low-density foams, flexible or rigid.

The invention also relates to foam, and preferably closed cell foam, prepared from a polymer foam formulation containing a blowing agent comprising the compositions of the present invention which exhibits a stable k-factors over time. In yet other embodiments, the invention provides foamable compositions comprising thermosetting foams, such as polyurethane and poiyisocyanurate foams, preferably low-density foams, flexible or rigid which exhibit k-factors substantially similar to current commercial blowing agents such as HFC245fa over time, It will be appreciated by those skilled in the art that the order and manner in which the blowing agent combination of the present invention is formed and/or added to the foamable composition does not generally affect the operability of the present invention. For example, in the case of polyurethane foams, it is possible that the various components of the blowing agent combination, and even the components of the present composition, not be mixed in advance of introduction to the foaming equipment, or even that the components are not added to the same location in the foaming equipment. Thus, in certain embodiments it may be desired to introduce one or more components of the blowing agent combination in a blender with the expectation that the components will come together in the foaming equipment and/or operate more effectively in this manner. Nevertheless, in certain embodiments, two or more components of the blowing agent combination arc combined in advance and introduced together into the foamable composition, either directly or as part of premix that is then further added to other parts of the foamable composition.

EXAMPLES

Example 1

The formulations tested (all had an Iso Index on ROH of 114) each contained Rubinate M, a polymeric methylene diphenyl diisocyanate (MDI) available from Huntsman; Jeffol R-425-X, a polyol from Huntsman; Voranol 490, a polyol from Dow Chemical, Terate 2541, a polyol from Invista, Antiblaze 80 is a flame retardant from Rhodia; Tegostab B 8404 is a surfactant from Goldschmidt Chemical Corporation. Polycat 8 and 5 (pentamethyldiethylenetriamine, PMDETA) are available from Air Products. Total blowing level is 24.5 mls/g. Table 1 summarizes the properties of the formulation tested.

TABLE 1

| Formulation | % (Weight) |
| --- | --- |
| Jeffol R-425-X | 10.33 |
| Voranol 490 | 17.21 |
| Terate 2541 | 6.88 |
| Antiblaze 80 | 2.29 |
| Water | 0.79 |
| Tegostab B8404 | 0.69 |
| Polycat 8 | 0.36 |
| PMDETA | 0.12 |
| 1233zd | 8.61 |
| Rubinate M | 52.72 |
| Total | 100.00 |

The A-side (MDI) and B-side (mixture of the polyol, surfactant, catalysts, blowing agent, and additives) were mixed with a hand mixer and dispensed into a container to form a free rise foam. When making a free rise foam, the dispensed material was allowed to expand in an open container. The resulting foam had a 26-second gel time, and 41-second tack free time, a free rise density of 1.69 lb(s)/ft$^3$ (lb/ft$^3$). When making a molded foam, the dispensed material was allowed to expand in a closed mold. The mold was kept closed for a few minutes before releasing the foam. The k-factor measurements (ASTM C518) on the resulting foams were conducted at between 10 and 130° F. Initial k-factors are taken within 24 hours after removing foam skin with a band saw. Lower k-factors indicate better insulation values. The results are summarized in Table 2.

TABLE 2

| Temperature ° F. | K Btu · in./ft$^2$ · h · ° F. |
| --- | --- |
| 17.6 | 0.1271 |
| 32.0 | 0.1285 |
| 50.0 | 0.1320 |

TABLE 2-continued

| Temperature ° F. | K Btu · in./ft² · h · ° F. |
|---|---|
| 75.2 | 0.1398 |
| 104.0 | 0.1499 |

Example 2

In the following examples, the foam was made by small polyurethane dispenser unless otherwise specified, The dispenser consisted of two pressurized cylinders, one for the A side (MDI) and one for the B side (polyol mixtures). The pressure in the cylinders could be adjusted by regulators. B-side mixtures were pre-blended and then charged into pressurized cylinders. Blowing agents were then added into B-side cylinder and mixed thoroughly. The cylinders were connected to a dispensing gun equipped with a static mixer. The pressures of both cylinders were adjusted so that desired ratio of the A and B sides could be achieved. The formulations tested (all had an Iso Index on ROH of 110) each contained Rubinate M, a polymeric methylene diphenyl diisocyanate (MDI) available from Huntsman; Jeffol SG-360 and R-425-X, polyols from Huntsman; TEAP-265, a polyol from Carpenter Company, TegostabB 8465 a surfactant available from Evonik-Degussa. Jeffcat TD33A and ZR-70 are catalysts from Huntsman. NP 9.5, a compatibilizer from Huntsman. Total blowing agent level was 26.0 mls/g. Table 3 summarizes the formulations of the study.

TABLE 3

Formulations

| | Formulation (wt %) | | |
|---|---|---|---|
| | HCFO1233zd (trans) | HFO1234ze | HFC134a |
| Jeffol SG-360 | 14.77 | 14.93 | 15.35 |
| Jeffol R-425-X | 4.22 | 4.27 | 4.39 |
| TEAP-265 | 8.44 | 8.53 | 8.77 |
| DEG | 2.11 | 2.13 | 2.19 |
| Jeffcat TD33A | 0.23 | 0.23 | 0.23 |
| Jeffcat ZR70 | 0.23 | 0.23 | 0.23 |
| Tegostab B8465 | 0.90 | 0.89 | 0.90 |
| NP 9.5 | 6.50 | 6.50 | 6.50 |
| Water | 0.42 | 0.42 | 0.42 |
| HFO1234ze | 0 | 11.56 | 0 |
| HCFO1233zd | 12.11 | 0 | 0 |
| HFC 134a | 0 | 0 | 9.47 |
| Rubinate M | 50.1 | 50.4 | 51.6 |
| A/B | 1.00 | 1.02 | 1.06 |

The k-factor measurements (ASTM C518) on the resulting foams were conducted at between 10 and 130° F. The results are summarized in Table 4. Initial k-factors are taken within 48 hours after removing the foam skin with a band saw. Lower k-factors indicate better insulation values. The results show the k-factor of foam blown with trans HCFO1233zd is superior to foam blown with HFO1234ze or HFC134a.

TABLE 4

Comparison of k-factor of foams

| Temperature (° F.) | HCFO1233zd (trans) | HFO1234ze | HFC134a |
|---|---|---|---|
| | K factor (Btu · in./ft² · h · ° F.) | | |
| 17.6 | 0.1222 | 0.1337 | 0.1298 |
| 32.0 | 0.1250 | 0.1373 | 0.1343 |

TABLE 4-continued

Comparison of k-factor of foams

| Temperature (° F.) | HCFO1233zd (trans) | HFO1234ze | HFC134a |
|---|---|---|---|
| | K factor (Btu · in./ft² · h · ° F.) | | |
| 50.0 | 0.1302 | 0.1430 | 0.1419 |
| 75.2 | 0.1416 | 0.1542 | 0.1535 |
| 104.0 | 0.1549 | 0.1677 | 0.1670 |

Table 5 shows that at the same blowing level, foams blown with trans HCFO1233zd exhibits a lower density and higher blowing efficiency than foams blown with HFO1234ze or HFC134a.

TABLE 5

Comparison of free-rise density of HFC134a and HCFO 1233zd (trans) foam

| Blowing agent | Free Rise Density (pcf) |
|---|---|
| HCFO1233zd (trans) | 1.71 |
| HFO1234ze | 1.78 |
| HFC134a | 2.01 |

Example 3

Testing following the procedure outlined above was undertaken with blowing agents comprising: a control with 99 wt % or more the trans isomer of HCFO-1233zd; a 96.5/3.5 wt % blend of trans and cis isomers of HCFO-1233zd; a 70/30 wt % blend of trans and cis isomers of HCFO-1233zd; and a 100 wt % cis isomer of HCFO-1233zd materials. The k-factor measurements (ASTM C518) on the resulting foams were conducted at between 18 and 104° F. Initial k-factors are taken within 24 hours after removing the foam skin with a band saw. K-factors were also measured at one week and one month. Lower k-factors indicate better insulation values. The foam formulations tested are summarized in Table 6 and each contained: Voranol 490 a polyol from Dow Chemical Company; Jeffol R-425-X a polyol from Huntsman; Stepan 2352 a polyol from Stepan; Poylcat-5 (PC-5) and Polycat-8 (PC-8) catalyst from Air Products; Tegostah B 8465 a surfactant from Evonik-Degussa; tris(1-chloro-2-propyl)phosphate (TCPP) a flame retardant.

TABLE 6

| | Control | 96.5/3.5 | 70/30 | 0/100 |
|---|---|---|---|---|
| B side | | | | |
| Voranol 490 | 18.09 | 18.09 | 18.09 | 18.09 |
| Jeffol R-425-X | 10.85 | 10.85 | 10.85 | 10.85 |
| Stepan 2352 | 7.24 | 7.24 | 7.24 | 7.24 |
| PMDETA (PC-5) | 0.07 | 0.07 | 0.07 | 0.07 |
| DMCHA (PC-8) | 0.37 | 0.37 | 0.37 | 0.37 |
| Tegostab B 8465 | 0.71 | 0.71 | 0.71 | 0.71 |
| TCPP | 2.36 | 2.36 | 2.36 | 2.36 |
| Added water | 0.64 | 0.64 | 0.64 | 0.64 |
| E1233zd | 7.00 | 6.75 | 4.90 | — |
| Z1233zd | — | 0.25 | 2.10 | 7.00 |
| Total B Side: | 47.34 | 47.34 | 47.34 | 47.34 |
| A Side | | | | |
| Index | 115 | 115 | 115 | 115 |
| Isocyanate | 52.7 | 52.7 | 52.7 | 52.7 |
| A/B | 1.11 | 1.11 | 1.11 | 1.11 |
| B/A | 0.90 | 0.90 | 0.90 | 0.90 |
| Total Blowing | 20.0 | 20.0 | 20.0 | 20.0 |

Figure 2:
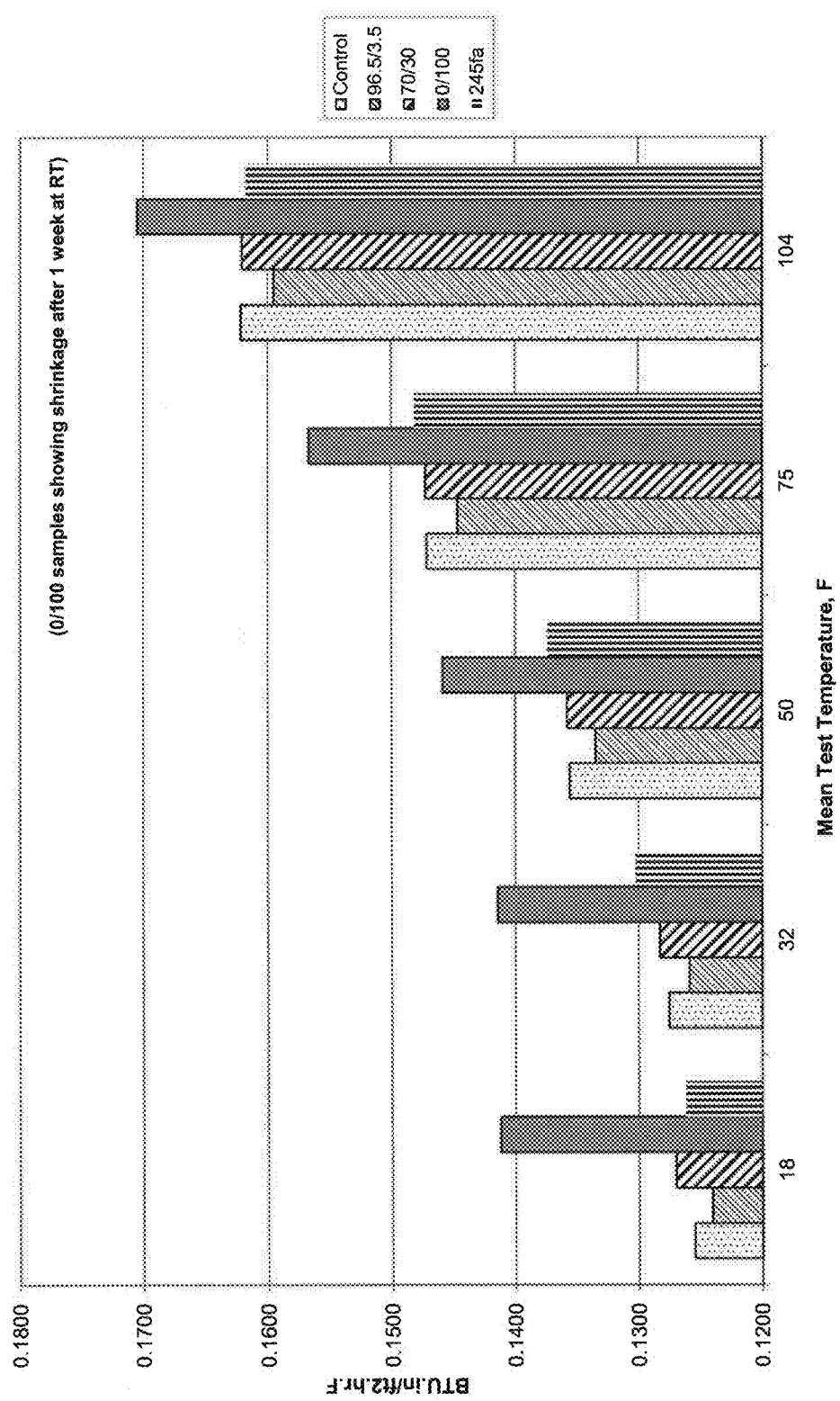
FIG. 2 is a graph of k-factor at one week versus temperature from Example 2.
Figure 3:
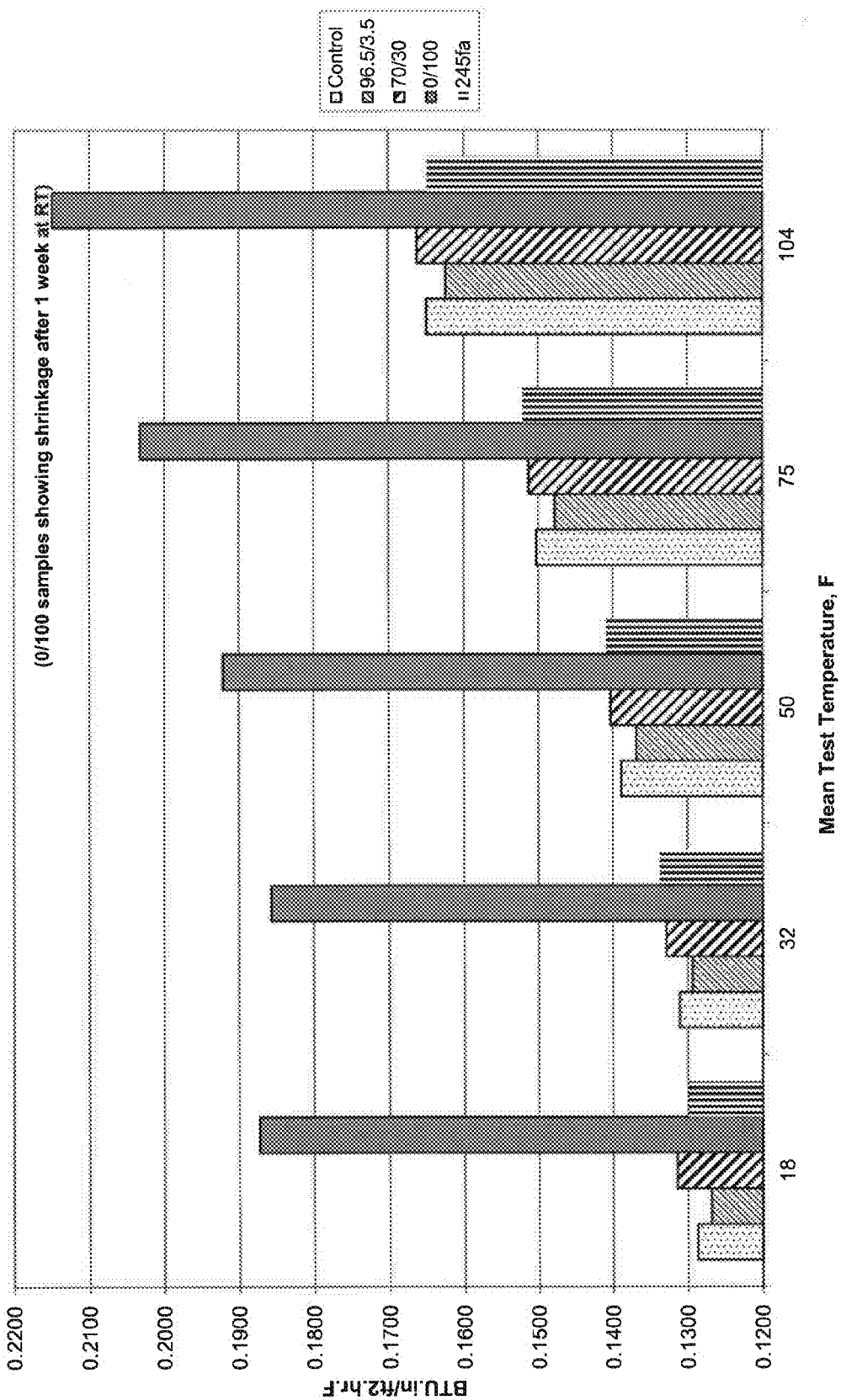
FIG. 3 is a graph of k-factor at one month versus temperature from Example 2.
Figure 4:
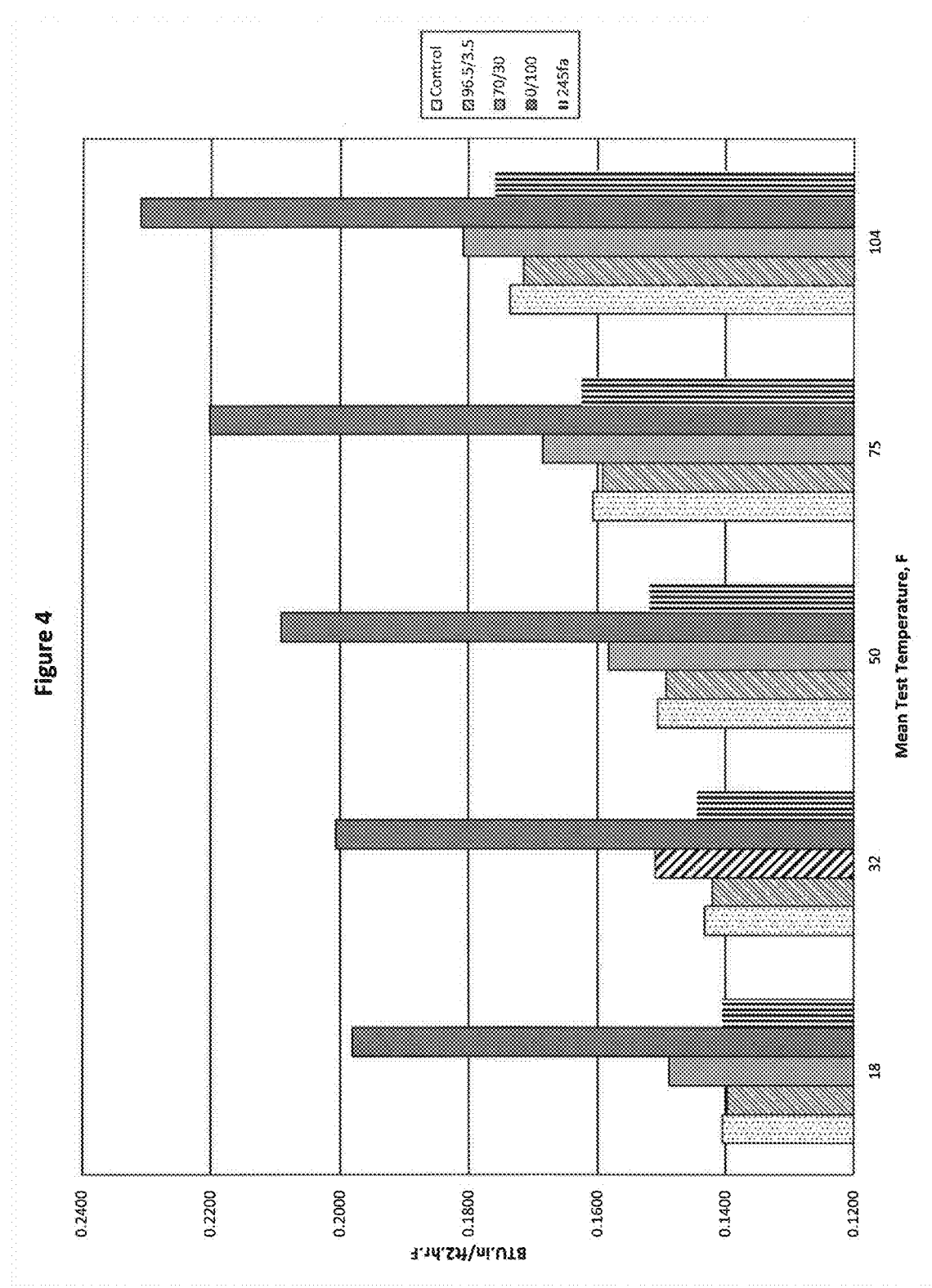
FIG. 4 is a graph of k-factor at three months versus temperature from Example 5.

The results are summarized in FIGS. 1, 2 and 3. FIG. 1 shows that initially, at lower temperatures, the cis materials exhibits a slightly higher k-factor, but the difference is negligible at higher temperatures between foams made using the control, over 99 wt % trans HCFO-1233zd composition, a 70/30 wt % trans/cis HCFO-1233zd mixture, a 96.5/3.5 wt % trans/cis HCFO-1233zd mixture and a 100 wt % cis HCFO-1233zd materials. However, FIGS. 2 and 3 show that after one week and one month of aging under ambient condition, foams made with the cis HCFO-1233zd material exhibited significant shrinkage that impacted k-factors. The foams made with 70 wt % or more trans HCFO-1233zd compositions exhibited negligible shrinkage and much lower k-factors. The impact on k-factor over time is believed to be, in part, due to dimensional stability changes, i.e. foam shrinkage, It is surprising and unexpected that the trans HCFO-1233zd and cis HCFO-1233zd isomers produced foam that exhibit such significantly different dimensional stability and thus k-factor over time.

Example 4

Toxological testing was undertaken as part of the evaluation of HCFO-1233zd as a blowing agent. Ames testing was performed on a blend of trans- and cis- HCFO-1233zd and purified trans- HCFO-1233zd. The Ames test is a study designed to determine if a material can interact with DNA and cause point mutations, i.e. to determine if a material is mutagenic. Many carcinogenic materials are also mutagenic and this assay is often used as a quick screen for potential to cause an adverse effect on genetic material. It utilizes several strains of bacteria (*Salmonella typhimurium* and *E. coli*) and is often routinely included when developing the toxicology profile of a substance. If a substance substantially increases the mutation rate in the bacterial tester strains, the study result is defined as positive and the test substance is considered to be mutagenic.

The purpose of the study was to evaluate the mutagenic potential of the test article vapor by measuring it ability to induce reverse mutations at selected loci of several stains of *Salmonella typhimurium* and at the tryptophan locus of *Escherichia coli* strains WP2 uvrA in the presence and absence of Aroclor-induced rat liver S9. The test system was exposed to the test article via desiccator methodology. For each replicate plating, the mean and standard deviation of the number of revertants per plate were calculated and reported. Negative and positive controls were also run.

For the test article to be evaluated positive, it must cause a dose-related increase in the mean revertants per plate of at least one tester strain over a minimum of two increasing concentrations of test article. Data for tester strains TA1535 and TA1537 were judged positive if the increase in mean revertants at the peak of the dose response is equal to or judged greater than 3.0-times the mean vehicle control value. Data sets for tester strains TA98, TA100 and WP2 uvrA were judged positive if the increase in mean revertants at the peak of the dose response is equal to or greater than 2.0-times the mean vehicle control value.

A mixture of cis- and trans-isomers of 1-chloro-3,3,3-trifluorpropene (CAS# 2730-43-0, HFCO-1233zd) consisting of 71.2 wt % trans- and 28.5 wt % cis-1-chloro-3,3,3-trifluoropropene was subjected to Ames assay as described above. Table 7 summarizes the composition of the materials tested by the Ames test.

TABLE 7

| Name | Weight % composition | |
| --- | --- | --- |
| | Mixture | Pure |
| trans-1-chloro-3,3,3-trifluoropropene | 71.2 | 96.5 |
| cis-1-chloro-3,3,3-trifluoropropene | 28.5 | 1.2 |
| others | 0.3 | 0.3 |

In the mutagenicity assay of the cis-/trans-mixture, a positive response was observed at ≥3.0 mL per desiccator with tester strain TA1535 in the presence of S9 activation as indicated by the increase in revertants per plate. No precipitate was observed but toxicity was observed (initial mutagenicity assay only) at ≥3.0 mL per desiccator with tester strain WP2 uvrA in the presence of S9 activation only as indicated by the drop to zero revertants per plate. This substance elicited a positive response in the Ames test and was reported to be mutagenic under the conditions of this assay.

A purified material, consisting of 96.5 weight % the trans-isomer of 1-chloro-3,3,3-trifluoropropene was subjected to testing in the Ames assay as described above. The purification of the material required multiple distillation steps. The results of the reverse mutation assay using vapor-phase exposure indicated that, under the conditions of the study, the material did not cause a positive mutagenic response with any of the tester strains in either the presence of or absence of Aroclor-induced rat liver S9. No toxicity was observed.

This testing indicated that the cis-isomer is the active mutagenic agent in this mixture. Removing most of the cis-isomer rendered the material non-mutagenic and thus, having a more favorable toxicity profile. The trans-isomer of 1-chloro-3,3,3-trifluoropropene was considered to be less toxic. The "other" materials 245fa; 244fa; and HFO-1234ze present in the materials tested were evaluated in foam studies and they did not significantly negatively impact foam dimensional stability.

Although the invention is illustrated and described herein with reference to specific embodiments, it is not intended that the appended claims be limited to the details shown. Rather, it is expected that various modifications may be made in these details by those skilled in the art, which modifications may still be within the spirit and scope of the claimed subject matter and it is intended that these claims be construed accordingly.

Example 5

Testing was undertaken to measure the evolution over time of the K-factor in foams made with various blowing agents.

The formulation of the foams was the following (in weight %):

TABLE 8

| Formulation | % (Weight) |
| --- | --- |
| Jeffol R-425-X | 10.85 |
| Stepanpol PS-2352 | 7.22 |
| Voranol 490 | 18.09 |
| Tris(chloropropyl) phosphate | 2.36 |
| Water | 0.64 |
| Tegostab B8465 | 0.71 |
| Polycat 5 | 0.07 |

TABLE 8-continued

| Formulation | % (Weight) |
| --- | --- |
| Polycat 8 | 0.37 |
| Blowing Agent | 7.00 |
| Rubinate M | 52.7 |

The blowing agents tested were: 245fa (1,1,1,3,3-pentafluoropropane a commercially available foam blowing agent); trans-1233zd (designated as "control" in FIGS. 4-9); cis-1233zd (designated as "0/100" in FIGS. 4-9); a 96.5%/3.5% mixture of trans/cis-1233zd (designated as "96.5/3.5" in FIGS. 4-9); and a 70%/30% mixture of trans/cis-1233zd (designated as "70/30" in FIGS. 4-9). The cis and trans isomers of 1233zd used in these experiments were 99.9% pure, FIG. 6 shows that the change in k-factor for foam made with HFC-245fa, after aging for six months, was 18.1% while the change in k-factor for foams made with blends of trans/cis HCFO-1233zd and trans HFCO-1233zd, after aging for six months, were 26.7, 21.4 and 20.3 percent. Thus foams made with trans/cis blends and trans HCFO-1233zd achieved a change in k-factor of about 10% or less relative to HFC245fa.

Physical test samples were made in 6"×6"×6" open box pours by a conventional hand-mix technique, Due to the nature of the free rise foams, the samples were cut such that the foam rise was parallel to the test face in order to minimize the effect of any defects running completely through the sample thickness. Also, since the k-factor samples were undersized, 5"×5"×1", each test piece was surrounded by like material in order to test a full 12"×12"×1" sample.

The k-factor measurements (according to ASTM C518) on the resulting foams were conducted at various temperatures between 17.6 and 104° F. (−8° C. to 40° C.). The test method covers the measurement of steady state thermal transmission through flat slab specimens using a heat flow meter apparatus.

Initial k-factors were taken within 24 hours after removing foam skin with a band saw. Other measurements were made 1 week, 1 month, 3 months and 6 months afterwards. The samples were stored at room temperature.

Lower k-factors indicate better insulation values.

FIG. 1 shows the initial K-factors, measured in Btu.in./ft$^2$.h.° F. No significant difference was observed in initial K-factors between the foams made with the various blowing agents. The tests on the aged samples (FIGS. 2-5) show that K-factors for foams made with 100% cis-1233zd increased significantly over time in comparison with foams made with blowing agents containing 70%, 96.5% or 100% trans-1233zd, as well as the 245fa blowing agent. FIG. 6 shows the percentages of change in k-factor over time at 50° F. (10° C.).

The invention claimed is:

1. A polyurethane foam composition comprising a polymer blowing agent composition comprising the hydrochlorofluoroolefin 1233zd wherein from about 70 to about 100 wt % of said hydrochlorofluoroolefin 1233zd is the trans stereoisomer of hydrochlorofluoroolefin 1233zd wherein said polyurethane foam composition exhibits a change in k-factor less than about 27 percent after aging for six months at ambient temperatures.

2. The polyurethane foam composition of claim 1 wherein said change in k-factor between about 20 percent and about 27 percent after aging for six months at ambient temperatures.

3. The polyurethane foam composition of claim 1 wherein said hydrochlorofluoroolefin 1233zd comprises about 90 wt % or more trans stereoisomer.

4. The polyurethane foam composition of claim 1 wherein said hydrochlorofluoroolefin 1233zd comprises about 96.5 wt % or more trans stereoisomer.

5. The polyurethane foam composition of claim 1, further comprising a hydrofluorocarbon.

6. The polyurethane foam composition of claim 5 wherein said hydrofluorocarbon is sleeted from the group consisting of difluoromethane (HFC32); 1,1,1,2,2-pentafluoroethane (HFC125); 1,1,1-trifluoroethane (HFC143a); 1,1,2,2-tetrafluorothane (HFC134); 1,1,2-tetrafluoroethane (HFC134a); 1,1-difluoroethane (HFC152a); 1,1,1,2,3,3,3-heptafluoropropane (HFC227ea); 1,1,1,3,3-pentafluoropropane (HFC245fa); 1,1,1,3,3-pentafluorobutane (HFC365mfc) and 1,1,1,2,2,3,4,5,5,5-decafluoropentane (HFC4310mee).

7. The polyurethane foam composition of claim 1, further comprising a hydrofluoroolefin.

8. The polyurethane foam composition of claim 7 wherein said hydrofluoroolefin is selected from the group consisting of tetrafluoropropenes; trifluoropropenes; tetrafluorobutene isomers; pentafluorobutene isomers; hexafluorobutene isomers; heptafluorobutene isomers; heptafluoropentene isomers; octafluoropentene isomers; and nonatluoropentene isomers.

9. The polyurethane foam composition composition of claim 1, further comprising an additive selected from the group consisting of hydrocarbons, C1 to C5 alcohols, C1 to C4 aldehydes, C1 to C4 ketones, C1 to C4 ethers, carbon dioxide, and C1 to C4 diethers.

10. The polyurethane foam composition of claim 9 wherein said hydrocarbon is selected from the group consisting of pentane isomers and butane isomers.

11. The polyurethane foam composition of claim 1, further comprising a hydrochlorofluoroolefin other than HCFC-1233zd.

12. A polyurethane foam composition comprising a polymer blowing agent composition comprising the hydrochlorofluoroolefin 1233zd wherein from about 70 wt % to about 100 wt % of said hydrochlorofluoroolefin 1233zd is the trans stereoisomer of hydrochlorofluoroolefin 1233zd wherein said polyurethane foam composition achieves a change in k-factor after aging for six months at ambient temperatures of less than 10% of the change in k-factor after aging for six months at ambient temperatures for polyurethane foam comprising HFC245fa blowing agent.

13. The polyurethane foam composition of claim 12 wherein said hydrochlorofluoroolefin 1233zd comprises about 90 wt % or more trans stereoisomer.

14. The polyurethane foam composition of claim 12 wherein said hydrochlorofluoroolefin 1233zd comprises about 96.5 wt % or more trans stereoisomer.

15. The polyurethane foam composition of claim 12, further comprising a hydrofluorocarbon.

16. The polyurethane foam composition of claim 15 wherein said hydrofluorocarbon is sleeted from the group consisting of difluoromethane (HFC32); 1,1,1,2,2-pentafluoroethane (HFC125); 1,1,1-trifluoroethane (HFC143a); 1,1,2,2-tetrafluorothane (HFC134); 1,1,1,2-tetrafluoroethane (HFC134a); 1,1-difluoroethane (HFC152a); 1,1,1,2,3,3,3-heptafluoropropane (HFC227ea); 1,1,1,3,3-pentafluoropropane (HFC245fa); 1,1,1,3,3-pentafluorobutane (HFC365mfc) and 1,1,1,2,2,3,4,5,5,5-decafluoropentane (HFC4310mee).

17. The polyurethane foam composition of claim 16, further comprising a hydrofluoroolefin.

18. The polyurethane foam composition of claim 17 wherein said hydrofluoroolefin is selected from the group consisting of tetrafluoropropenes; trifluoropropenes; tetrafluorobutene isomers; pentafluorobutene isomers; hexafluorobutene isomers; heptafluorobutene isomers; heptafluoropentene isomers; octafluoropentem isomers; and nonafluoropentene isomers.

19. The polyurethane foam composition composition of claim 12, further comprising an additive selected from the group consisting of hydrocarbons, C1 to C5 alcohols, C1 to C4 aldehydes, C1 to C4 ketones, C1 to C4 ethers, carbon dioxide, and C1 to C4 diethers.

20. The polyurethane foam composition of claim 19 wherein said hydrocarbon is selected from the group consisting of pentane isomers and butane isomers.

21. The polyurethane foam composition of claim 12, further comprising a hydrochlorofluoroolefin other than HCFC-1233zd.

\* \* \* \* \*